W. F. JACKSON.
AUTOMOBILE FENDER.
APPLICATION FILED APR. 15, 1914.
1,121,727.   Patented Dec. 22, 1914.
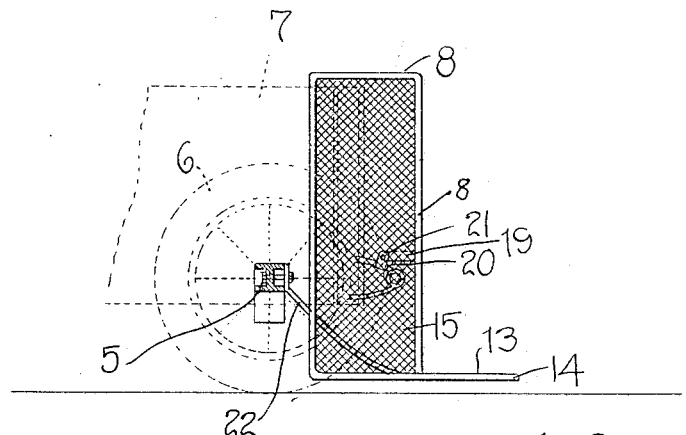
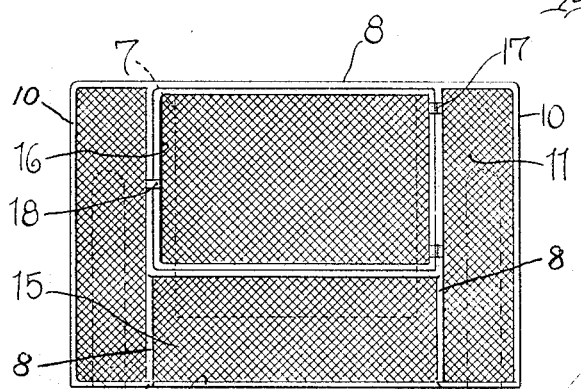
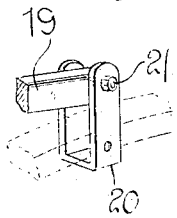
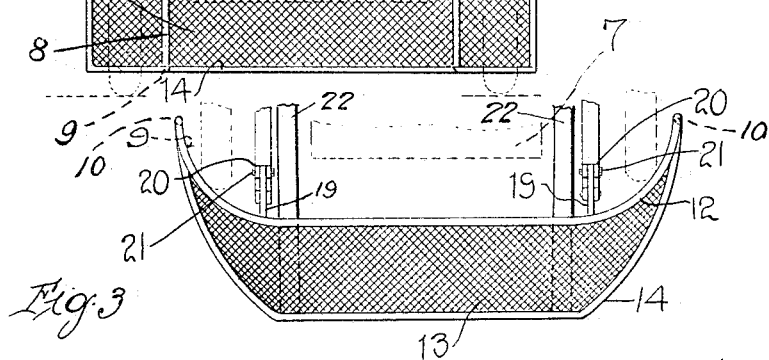
Inventor
W. F. JACKSON
Witnesses
By Watson E. Coleman
Attorney

UNITED STATES PATENT OFFICE.

WILLIAM F. JACKSON, OF BRIDGEPORT, ILLINOIS.

AUTOMOBILE-FENDER.

1,121,727.     Specification of Letters Patent.     Patented Dec. 22, 1914.

Application filed April 15, 1914. Serial No. 832,013.

*To all whom it may concern:*

Be it known that I, WILLIAM F. JACKSON, a citizen of the United States, residing at Bridgeport, in the county of Lawrence and State of Illinois, have invented certain new and useful Improvements in Automobile-Fenders, of which the following is a specification, reference being had to the accompanying drawings.

This invention relates to automobile fenders and has for its primary object to provide a device of this character which may be easily and quickly applied to the forward end of a motor vehicle and will absolutely prevent all liability of the wheels passing over a person or other object struck by the vehicle.

The invention has for a further object to provide a fender for automobiles and similar vehicles which is extremely strong and durable in its construction and includes side fender sections which extend over the sides of the forward portions of the vehicle wheels, said fender being provided with a hinged section whereby access may be had to the crank for the purpose of starting the engine.

With the above and other objects in view, the invention consists in the novel features of construction, combination and arrangement of parts as will be hereinafter referred to and more particularly pointed out in the specification and claim.

In the accompanying drawing forming a part of this application, Figure 1 is a side elevation of the forward end of a motor vehicle having my improved fender applied thereto. Fig. 2 is a front elevation. Fig. 3 is a top plan view; and Fig. 4 is a detail perspective view illustrating the manner of fastening the fender upon the vehicle springs.

Referring in detail to the drawing, 5 designates the vehicle axle and 6 indicates the wheels which are suitably mounted thereon. My improved fender is arranged in advance of the vehicle wheels and the radiator 7 of the machine.

The fender consists in its preferred construction of a heavy metal U-shaped frame rod 8 forming a rectangular body section, the vertical sides of said body section having laterally curved extensions at its lower end, as indicated at 9. These curved lower extensions of the frame body are secured to the marginal frame rods 10 of the side sections 11 of the fender. These side sections extend around the forward portions of the vehicle wheel 6 and in spaced relation to the outer sides thereof. The upper ends of the frame rods 10 are curved, as indicated at 12 and suitably secured to the upper horizontal portion of the rectangular frame rod 8. At the juncture of the lower ends of the rods 10 of the side sections 11 and of the curved frame extensions 9, a forwardly projecting fender section 13 is secured. This latter fender section is disposed slightly above the ground surface, when the fender is properly applied to the vehicle, and includes the marginal rod 14 to which the reticulated fabric of the fender section is secured. This rod is suitably fixed at its ends to the body of the fender. It will be understood that each of the fender sections is preferably formed of reticulated wire fabric and a similar fabric shown at 15 also connects the curved extensions 9 of the frame body to the lower horizontal portion of the rectangular frame rod 8.

16 designates a gate or door which is hinged as at 17 to one side of the rectangular frame rod 8 and is adapted to be held in its closed position by a suitable latch shown at 18. It will be understood that said door is provided for the purpose of affording access to the crank for starting the engine.

My improved fender may be easily and quickly mounted upon motor vehicles of the ordinary construction and, to this end, I provide rearwardly projecting arms 19 which are fixed to opposite sides of the rectangular frame rod 8, at its lower end. These arms are adapted to be arranged between the upstanding arms of the U-shaped clips 20 which are fixed to the upper half of the elliptical vehicle springs and removably secured therein by means of the bolts 21. As an additional bracing and strengthening means for the fender, I provide the rearwardly and upwardly curved bars 22 which are suitably secured to the lower edge of the fender frame and are fixed at their rear ends to the wheel axle 5. The upper edge of the fender, when the same is applied to the vehicle, is disposed slightly below the lamps.

From the foregoing description, taken in connection with the accompanying drawing, it will be seen that I have produced a device which, while very simple in its construction, is highly serviceable and convenient in practical use and greatly reduces the liability of accident and serious injury to pedestrians. The fender may be very easily and quickly applied, without necessitating the employment of skilled labor and, owing to its extreme simplicity, may be produced at small manufacturing cost. The device does not detract from the appearance of the automobile, and it will be manifest that the fender might be constructed in various ornamental shapes, so as to enhance the pleasing appearance of the machine.

While I have shown and described the preferred construction and arrangement of the several detail parts of the invention, it will be understood that the same is, nevertheless, susceptible of considerable modifications and changes and I therefore reserve the privilege of resorting to all such legitimate changes as may be fairly embodied within the spirit and scope of the invention as claimed.

Having thus described this invention, what I claim is:—

The combination with a vehicle, of a fender therefor including a rectangular inverted U-shaped frame rod forming a body section, said rod being provided upon its lower ends with laterally and rearwardly curved extensions, side sections each having a marginal frame rod provided with a vertical portion fixed at its lower end to one of the laterally curved extensions of the main frame rod and provided at its upper end with a horizontally extending laterally curved portion which is fixed to the U-shaped frame rod of the body section of the fender, a horizontally disposed fender section also provided with a marginal frame rod having curved end portions secured at their extremities to the laterally curved extensions of the frame of said body section, reticulated material secured upon the frame rods of each fender section, and means for mounting the fender upon a vehicle body.

In testimony whereof I hereunto affix my signature in the presence of two witnesses.

WILLIAM F. JACKSON.

Witnesses:
M. CARLISLE LYDDANE,
CHAS. M. BIRCKHEAD.

Copies of this patent may be obtained for five cents each, by addressing the "Commissioner of Patents Washington, D. C."